United States Patent
Bernhardt et al.

(10) Patent No.: US 7,505,821 B2
(45) Date of Patent: Mar. 17, 2009

(54) LAYOUT-ORIENTED RECORDING OF AUTOMATION INFORMATION

(75) Inventors: Heinz Bernhardt, Nürnberg (DE); Soeren Moritz, Wimmelbach (DE)

(73) Assignee: Siemens Aktiengesellschaft, Munich (DE)

( * ) Notice: Subject to any disclaimer, the term of this patent is extended or adjusted under 35 U.S.C. 154(b) by 387 days.

(21) Appl. No.: 10/535,720

(22) PCT Filed: Oct. 30, 2003

(86) PCT No.: PCT/DE03/03615

§ 371 (c)(1), (2), (4) Date: Jan. 4, 2006

(87) PCT Pub. No.: WO2004/046973

PCT Pub. Date: Jun. 3, 2004

(65) Prior Publication Data

US 2007/0008319 A1    Jan. 11, 2007

(30) Foreign Application Priority Data

Nov. 21, 2002    (DE) ................. 102 54 536

(51) Int. Cl.
*G06F 19/00* (2006.01)
*G05B 15/00* (2006.01)

(52) U.S. Cl. .............. 700/86; 700/29; 700/83; 700/65; 345/440

(58) Field of Classification Search ................ 345/440; 700/29, 83, 65, 86
See application file for complete search history.

(56) References Cited

U.S. PATENT DOCUMENTS

| 4,829,445 | A | * | 5/1989 | Burney ................ 700/230 |
| 5,610,828 | A | * | 3/1997 | Kodosky et al. ............ 716/11 |
| 5,732,277 | A | * | 3/1998 | Kodosky et al. ........... 717/125 |
| 6,369,841 | B1 | | 4/2002 | Salomon et al. |
| 6,608,638 | B1 | * | 8/2003 | Kodosky et al. ........... 715/771 |
| 6,889,172 | B2 | * | 5/2005 | Sierer et al. .............. 702/188 |
| 2002/0047865 | A1 | | 4/2002 | Bozionek et al. |
| 2003/0034998 | A1 | * | 2/2003 | Kodosky et al. ........... 345/736 |
| 2003/0035005 | A1 | * | 2/2003 | Kudosky et al. ........... 345/763 |

FOREIGN PATENT DOCUMENTS

WO    WO 97/15877 A2    5/1997

OTHER PUBLICATIONS

"GPIB—IEEE 488: Computer Based Measuring Techniques", Mar. 7, 2002, printed from http://www.fysik.uu.se/.*
"Web-Based Flow Visualization Facility: Operations Manual", Credle et al, Senior Design Project, Apr. 3, 2001.*

(Continued)

*Primary Examiner*—Michael D Masinick

(57) ABSTRACT

The invention relates to a system and a method for the graphical recording of system requirements and specifications in electronically readable form. Elements of a plant are graphically represented by selectable components. The components are graphically rendered in a relationship to each other and a control-relevant circuitry automatically specified based on the established relationship and prepared in electronic form.

17 Claims, 3 Drawing Sheets

OTHER PUBLICATIONS

Saifallah Benjaafar, "Design of Manufacturing Plant Layouts with Queueing Effects", Robotics and Automation, 1998. Proceedings. 1998 IEEE International Conference, Leuven, Belgium, May 16-20, 1998, New York, NY, USA, IEEE, May 16, 1998, pp. 260-265, XP010281102.

Minder Chen, CASE Data Interchange Format (CDIF) Standards: Introduction and Evaluation, System Sciences, 1993, Proceeding of the Twenty-Sixth Hawaii International Conference, Wailea, HI, USA, IEEE, Jan. 5, 1993, pp. 31-40, XP010031619.

Hilding Elmqvist, "A Uniform Architecture for Distributed Automation", Advances in Instrumentation and Control, Instrument Society of America, Research Triangle Park, US, pp. 1599-1608, vol. 46, No. Part 2, 1991 XP000347589.

Robert P. Judd, Raymond S. Vanderbok, Mark E. Brown, John A. Sauter, "Manufacturing System Design Methodology: Execute the Specification", Rapid System Prototyping, 1990, Shortening the Path from Specification to Prototype, First International Workshop on Research Triangle Park, NC, USA, Jun. 4-7, 1990, Los Alamitos, CA, USA, IEEE Comput., Soc., US, Jun. 4, 1990, pp. 97-115, XP010024369.

Michael B. Thompson, "AutoMod II: The System Builder", Proceedings of the 1989 Winter Simulation Conference, Dec. 4, 1989, pp. 235-242, XP010305701.

* cited by examiner

FIG 1
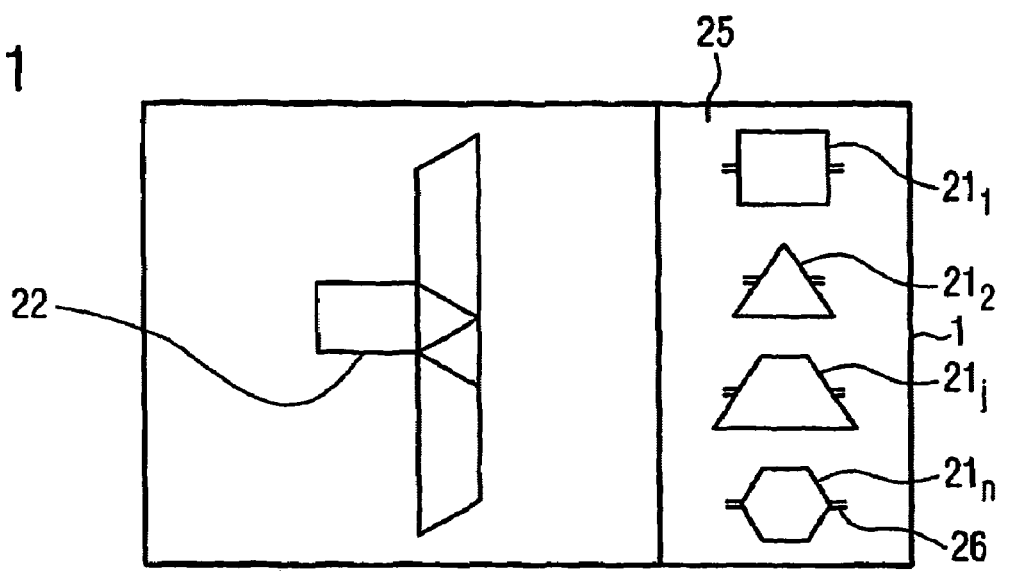
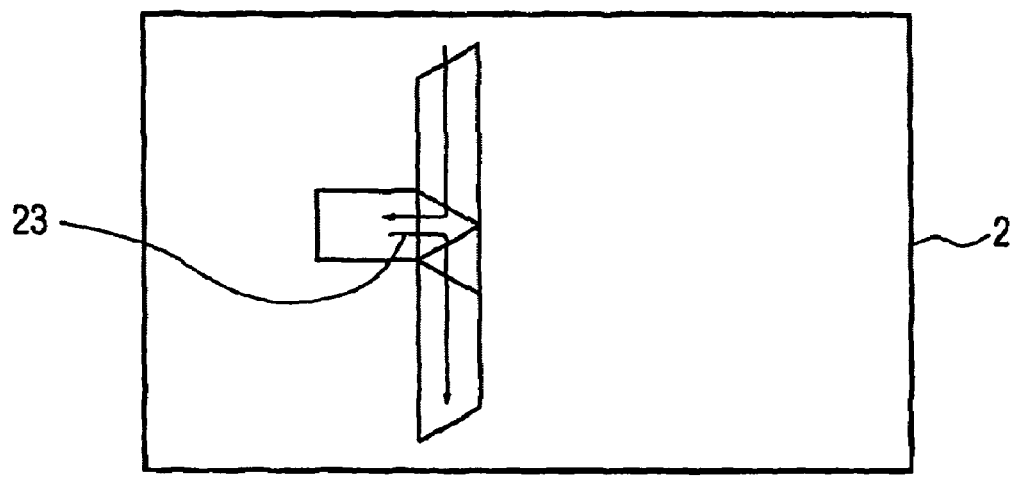
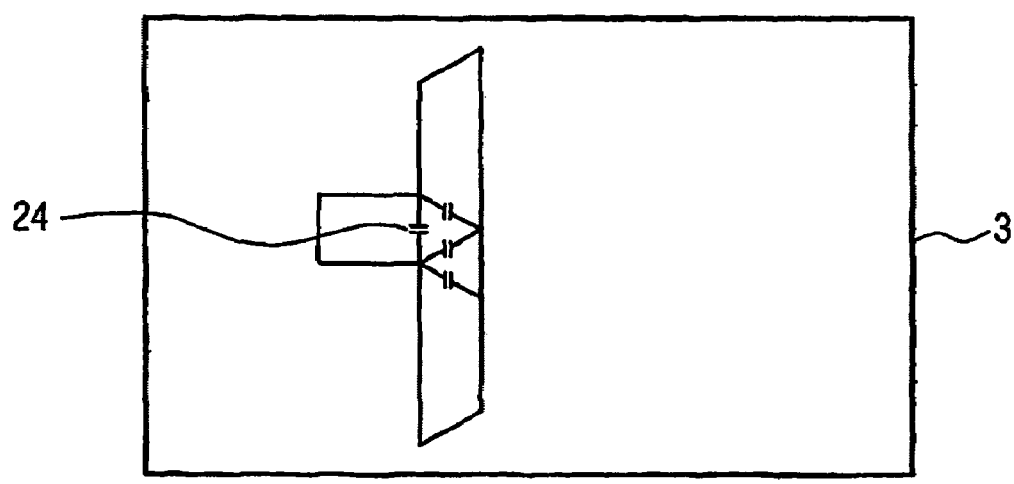

LAYOUT-ORIENTED RECORDING OF AUTOMATION INFORMATION

CROSS REFERENCE TO RELATED APPLICATIONS

This application is the U.S. National Stage of International application No. PCT/DE2003/003615, filed Oct. 30, 2003 and claims the benefit thereof. The International application claims the benefits of German application No. 10254536.7 filed Nov. 21, 2002, both applications are incorporated by reference herein in their entirety.

FIELD OF THE INVENTION

The invention relates to a system and a method for the graphical recording of system requirements and specifications in a form which can be analyzed electronically.

BACKGROUND OF THE INVENTION

Technical drawings are generally used as a point of departure for the automation of plants or machines today. The drawings are designed from the perspective of plant engineering, mechanical engineering, or process engineering. When it is necessary to develop an automation solution, the requirements and specifications which are associated with the system are usually formulated on the basis of these drawings. Controllers for emergency cut-off circuits, the formation of component groups belonging to a controller, or a network topology, for example, are developed on the basis of corresponding drawings. In this context, the development takes place by means of manual conversion from the drawing, without specific drawing elements being associated with semantics which could be used automatically for the specification of an automation solution. The conversion is effected manually or verbally instead. In this context, relevant information which can be extracted from the drawing is often only partially transferred. Consequently, it is not currently possible to use the information from the technical drawings directly for the implementation of an automation solution.

SUMMARY OF THE INVENTION

The invention addresses the problem of allowing a simplified layout-oriented recording of requirements and specifications for an automation system and a provision of the information in a form which can be analyzed electronically.

This problem is solved by a system for the layout-oriented recording of control-relevant information, having first means for graphically describing structures which consist of individual components, second means for graphically establishing at least one directed relationship between components of the described structures, and third means for specifying a control-relevant interconnection of the components depending on the established relationships.

This problem is further solved by a corresponding method.

In this approach to the solution, control-relevant information is graphically and interactively integrated directly into technical drawings. The information is incorporated by means of predefined or user-defined elements. In this context, a process-engineering problem is solved with the aid of a drawing. A complex structure which consists of individual e.g. physical components is described using drawing means. Within this concept, the components are depicted in their spatial arrangement. A physical layout, i.e. a description of e.g. a conveyor unit can be generated in this way. The participating components are then fixed in relation to each other. This is also performed graphically, e.g. by entering a material flow within a conveyor unit into the structure.

Depending on the directed relationship which is thus defined between the participating components of the complex structure, an interconnection comprising the individual components, i.e. a control-relevant linking of the individual components, is then specified or constructed. Depending on their position within the complex structures and depending on the directed relationships to the adjacent elements, the individual components are interconnected in this way within the complete system.

When using the proposed system, it is advantageous that the control behavior of individual components in relation to their environment can be recorded and specified using drawings. It is therefore unnecessary for a developer, when developing an automation solution, to extract control-relevant information from a drawing, to then interpret this information and finally to implement it. The relevant information is derived from the relationships between the individual participating components, said relationships being established in the graphical representation. The specification of control behavior is greatly simplified and improved in this way.

An advantageous development of the invention is characterized in that the control-relevant information is provided for recording for an automation system of a process-engineering and/or production-engineering plant. When designing complex industrial plants, it is particularly important to produce an optimally efficient design for the control engineering and the associated control behavior of a plant. Drawings of a plant structure must be translated into control-relevant information. As part of this activity, information can easily be lost or information which is present in the drawing can be incorrectly interpreted by the developer.

The claimed system primarily simplifies the recording of control-relevant information for complex plants of this type because, once it has been graphically designed, the plant can also be specified in terms of its control behavior automatically with reference to the graphical representation. All of the components which are used in the plant are represented as elements in the graphical representation, and their behavior in the overall structure of the plant can be described on the basis of the graphical representation in such a way that the involvement of all elements in the control of the plant can be specified as precisely as possible. The claimed system is most suitable for the design of complex control tasks in particular.

A further advantageous development of the invention is characterized in that the components are developed in a library as types having type-dependent properties and data interfaces. This enables a developer to store specific recurring elements, e.g. of a plant, in the library and to allocate specific properties to said elements. For example, a conveyor belt or an elevating platform can be stored in the library. The user can then define properties which are typical and always occur for precisely these elements. In this context, it is possible for properties to be both predefined and freely configurable by a user in each case. The nature and quantity of the data interfaces that are required for the individual components are likewise stored in connection with the types in the library. The data interfaces also have specific properties which are dependent on the components concerned. This development of the invention makes it possible to store recurring objects that have been pre-prepared, thereby reducing the effort involved in the specification of an automation solution, since reusable modules can be utilized and the components already feature predetermined interconnection possibilities as a result of their specific data interfaces, and therefore a preselection of possible combinations can be presented to a developer. The effort which is involved in generating an automation solution is therefore significantly reduced by using the component library.

A further advantageous development of the invention is characterized in that provision is made for the interconnection of the components via the data interfaces. Such an interconnection of the components via the data interfaces ensures that it is only possible to select those components which can also be connected to an existing component or to the ports thereof. The use of the data interfaces for the interconnection therefore predetermines a selection of possible combinations, which greatly simplifies the specification of an automation solution for a developer.

A further advantageous development of the invention is characterized in that provision is made for the establishment of the directed relationships between the components on the basis of a material flow in a process-engineering and/or production-engineering plant. In order to establish essential predecessor/successor relationships of participating elements for the control of a plant, the use of the material flow within a plant is an ideal solution since the material flow in terms of spatial behavior is immediately apparent to a user of the system. It is not necessary in an academic manner to determine the individual elements of the plant in relation to each other, but the simple graphical inclusion of the material flow in a drawing automatically establishes the predecessor-successor relationship which is so important. The specification of an automation solution is greatly simplified by this advantageous development of the invention.

A further advantageous development of the invention is characterized in that provision is made for an information flow between the components which runs counter to the material flow. A reverse-directed information flow which runs counter to the material flow and between the participating components advantageously guarantees traceability within the system. A predecessor component always knows whether its successor component has sufficient holding capacity for the material which must be passed on, or whether the position for the next production piece is also already free again. Production-related data can also be obtained easily from this information flow, thereby allowing materials tracking e.g. in connection with a tracking system at MES level (Manufacturing Execution Systems).

A further advantageous development of the invention is characterized in that provision is made for the establishment of the directed relationships between data interfaces of adjacent components on the basis of the distance of the components from each other and existing information about the data interfaces. The spatial location of components in the graphical layout can be used advantageously in this way for constructing or specifying the interconnection of the components. The relationships between the data interfaces or ports of two or more adjacent components can be derived automatically on the basis of the geometric information, e.g. position in the layout, together with a predeterminable threshold value for the definition of the required proximity of the components in relation to each other in the system or in the layout and specific information about the ports. In this context, the port information includes e.g. details about the type or the direction of the data flow (IN/OUT). If the corresponding information is available, a user of the system can easily establish the relationship and therefore the interconnection by bringing the components together in the corresponding positions on the interface of a screen, e.g. using a mouse.

A further advantageous development of the invention is characterized in that type information and/or entity information and/or location information about the components is provided for use from the graphical layout. A specific description of the components which are used, e.g. elevating platforms or conveyor belts, is already possible from the graphical layout. This information can then be utilized advantageously for the use of maintenance management systems, for example. In this context, location information which is based on a graphical representation can be supplied to a maintenance management system. The information about the participating components does not have to be entered separately into such a system. Use of auxiliary information systems such as e.g. plant information systems becomes significantly easier in this way and is also financially simpler to implement.

A further advantageous development of the invention is characterized in that fourth means are provided for the layout-oriented addition of further properties to components. This already allows a developer to add further properties, e.g. via a separate input field on the user interface of the system, into the graphical representation of a specific component. These properties can be e.g. functions such as "switch up" or "switch down", which have already been added by the developer at the graphical level of a component. In this way, the automation-engineering behavior of the individual components is recorded more easily already in the graphical layout and made available for the use of an automation solution.

A further advantageous development of the invention is characterized in that provision is made for a layout-oriented combination of components into groups. It is also advantageous that provision is made for a layout-oriented assignment of higher-order semantics to the groups. A plurality of components can be connected to a specific function, for example. There may be so-called "emergency areas", for example, which must be switched off uniformly. Likewise a plurality of components can be assigned to a specific controller, or a plurality of components can be assigned to a specific area in which a system is used for operations and monitoring (HMI, Human Machine Interface).

The combination of components into groups facilitates the assignment to e.g. a controller or an HMI. In this context, the groups can overlap each other without restriction. This means that a component can be assigned in conjunction with other components to a specific controller, but be represented visually with its data in conjunction with other different components on an HMI system. In this context, the groups can be allocated a standard behavior in the form of a function in each case. This development allows a simple structuring of the plant and a simple mapping of the automation solution which results therefrom. A consistent development of the overall automation framework of a plant is greatly simplified in this way.

A further advantageous development of the invention is characterized in that provision is made for an assignment of elements for delimiting permitted value ranges and/or attributes to components and/or functional groups and/or data interfaces. It is possible to define the validity of relationships by entering such "constraint elements", which can restrict or limit the possible interactions between data interfaces, components or functional groups. Firstly this allows the validation of the established relationships since it automatically applies that only those components which can be connected to an existing component or its interfaces without contravening the "constraints" are selected. Secondly this allows the derivation of information such as e.g. whether the maximal number of port connections has been reached on a multiport or whether the sum of the loads exceeds the permitted maximal current, for example. It is also possible to include the checking of boundary conditions that must be satisfied by entering virtual components with corresponding "constraints". It is therefore possible to define e.g. a threshold for the maximal costs across all the components that are used.

A further advantageous development of the invention is characterized in that provision is made for a layout-oriented generation of a network configuration for the communication of the components of a process-engineering and/or production-engineering plant. If the individual components are placed in relation to each other, and if higher-level automation-related units are defined on the basis of components that are combined into groups, it is possible to network the participating components directly at the graphical level. The network topology does not have to be developed separately. It is instead derived from the position of the components and the relationships which are defined between the components. It is easy to design and specify the required network topology in this way.

BRIEF DESCRIPTION OF THE DRAWINGS

The invention is described and explained in greater detail below with reference to the exemplary embodiments that are illustrated in the figures in which:

FIG. 1 shows a schematic diagram of the system for recording control-relevant information.

DETAILED DESCRIPTION OF THE INVENTION

Figure 2:
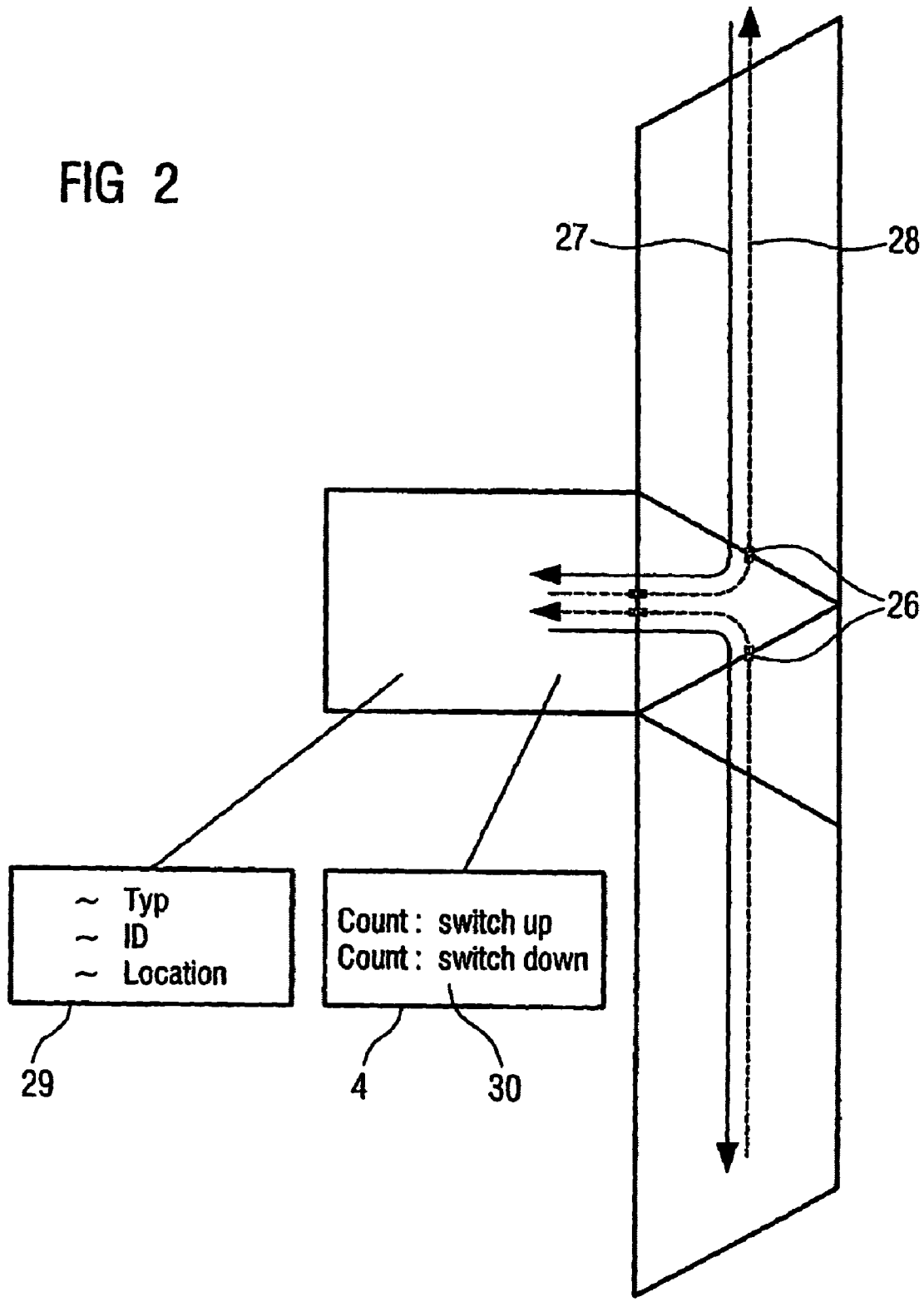
FIG. 2 shows a schematic diagram of individual components and their directed relationships and properties.

FIG. 1 shows an exemplary embodiment of the system for layout-oriented recording of control-relevant information. A graphical description of e.g. a plant consisting of individual components $21_{1 \ldots j}$ is created in the system with the aid of first means 1. The components $21_{1 \ldots j}$ are selected from a set of components $21_{1 \ldots n}$ which are stored in a library 25. In this context, the selected components $21_{1 \ldots j}$ are used for graphically describing the plant structure 22, whereby a complex plant can be formulated graphically. Directed relationships 23 between the selected components $21_{1 \ldots j}$ are graphically described with the aid of the second means 2, such that they are stored in the layout. The specification of an interconnection 24 between the selected components $21_{1 \ldots j}$ is generated by means of third means 3. The interconnection 24 takes place in accordance with the directed relationships 23 via data interfaces 26. In this way, the components $21_{1 \ldots j}$ are interrelated in terms of data.

The advantage of the claimed development of the system, as illustrated in FIG. 1, is that sections of a plant which are represented here as a set of desired components $21_{1 \ldots n}$ can easily be positioned in relation to each other graphically. Their data-related interfaces 26 can be linked together by defining directed relationships 23 with reference to the layout, and converted directly into control-relevant information.

In this context, the components $21_{1 \ldots n}$ each have a unique identification code and type information. The components $21_{1 \ldots n}$ can be assigned any number of properties, which are known as attributes. In FIG. 2, the properties of the components $21_{1 \ldots n}$ are represented by symbols having different forms. Properties or attributes of components $21_{1 \ldots n}$ can be conventional data types such as "integer" or "real", for example, and they can also be structures such as "fields" or "arrays". Quantities of data interfaces 26, which are known as ports, can also be assigned as attributes. It is also possible to define links to further elements, e.g. files or entries in other documents, as attributes. In this context, a so-called link attribute can be assigned a defined access interface (e.g. in the form of a DLL). Such an access interface allows access to data in a referenced element e.g. an Excel file.

The attributes can also be used to assign semantics 32 to components $21_{1 \ldots n}$. A component $21_i$ within a plant can be assigned the information that it is a conveyor element or an elevating platform, for example. It is also possible to assign a rule to an attribute, said rule describing how a specific attribute value can be derived from other attributes. In addition to the attributes, the components $21_{1 \ldots n}$ have an unlimited number of ports or data interfaces 26. Components having ports or data interfaces 26 of the same structure can be connected together via these interfaces. The quantity and type of the respective attributes which describe the port are relevant in relation to the structure of a port. A connection direction in the sense of In/Out can be assigned to individual attributes of a port or to the whole port. This connection direction can be developed unidirectionally in the sense of "either-or" if a conveyor element only has one conveyor direction. However, the connection can also be developed bidirectionally in the sense of "both-and" if a conveyor element has two conveyor directions (forwards/backwards; up/down). The port can be defined as IN and OUT in order to allow both directions in this case, or a graphical port being representative is assigned a logical IN port and a logical OUT port. It is also possible to define multiports which can be connected to more than one other port.

If the components $21_{1 \ldots j}$ which have been selected for the description are assigned a direction with the aid of the second means for graphically establishing a directed relationship 23, in such a way that each component $21_i$ has a defined predecessor and a defined successor, the participating components $21_{1 \ldots j}$ can be interconnected with each other via their available ports or data interfaces 26. It is therefore possible to specify an automation solution merely by graphically arranging the components $21_{1 \ldots j}$ which already contain their control-relevant individual information in the form of their properties and their data interfaces 26. In this context, it is necessary to consider as objects those individual components $21_{1 \ldots j}$ which manifest specific properties depending on their neighbors in the overall system of the plant. The information which is relevant for the specification of the controller can therefore be extracted directly from the position of the individual components $21_{1 \ldots j}$ in the graphical representation.

FIG. 2 illustrates an exemplary embodiment of the invention in which the relationships 23 between the selected components $21_{1 \ldots j}$ are established with the aid of a material flow 27. The connection of ports or data interfaces 26 is shown graphically here. A connecting line between the graphically represented ports is simply drawn along the material flow 27 that is planned in a plant. If a material flow 27 is used for establishing the connection, the connection is automatically directed. The connection can also be made by simply positioning the components $21_{1 \ldots j}$ in a corresponding manner, with the result that ports or data interfaces 26 to the neighbor elements or components $21_{1 \ldots j}$ are automatically set up if the elements are within a defined distance of each other. An information flow 28 which runs counter to the material flow 27 is automatically established by the system. The information flow 28 runs along the established data interfaces 26 between the components $21_{1 \ldots j}$.

For each of the components $21_{1 \ldots j}$ there exists an information item which describes the type of the component $21_i$ concerned as well as its identity and its properties e.g. the number of data interfaces 26 together with their properties. In this context, one component $21_i$ can also contain a further component $21_{i+1}$ in the form of a property. This development allows a nesting of components such that components can consist of other components. As a result of this, installation components such as control cabinets or racks can be implemented in the layout of the plant, for example. A higher-order component also has higher-order properties accordingly.

The graphical representations of the components $21_{1...n}$ can be present in 2D form or even 3D form, for example, and possess general properties of the components $21_{1...n}$ which they represent, i.e. they have a specific position, an orientation, a size and a specific form. In addition to type, identity and location 29, a component $21_i$ can also be assigned a set of further properties 30. These additional properties 30 can be assigned to the components $21_{1...n}$ in advance, such that they are available in the component library 25. However, it is also possible for properties to be entered by the user at any time via special input windows and assigned to the components $21_{1...n}$.

The most important advantage of the embodiment of the invention which is illustrated in FIG. 2 is that the individual elements or components $21_{1...j}$ that make up a plant can easily be positioned in relation to each other. On one hand, the components $21_{1...j}$ can be graphically arranged in such a way that they establish a connection over a defined distance to neighboring objects and an interconnection can take place on the basis of this spatial proximity. On the other hand, it is possible for the interconnection between the components $21_{1...j}$ to be implemented as a result of the components $21_{1...j}$ being positioned in a directed relationship 23 to each other, i.e. by a system user establishing a unidirectional connection between the participating components $21_{1...j}$, e.g. by entering a material flow 27. Linking of the components $21_{1...j}$ is then implemented via the relevant data interfaces 26 and data transfer is possible between the components $21_{1...j}$.

In this context, it is advantageous that the material flow 27 runs counter to an information flow 28 between the components $21_{1...j}$. This is beneficial if, for example, it is necessary to trace the material flow 27 within the plant in the context of an MES system. The counter-directed information flow 28 is essential for the smooth functioning of the components $21_{1...j}$ in the overall system. It ensures that a component $21_i$ knows the status of its successor component $21_{i+1}$ and whether e.g. a material can be passed on.

Each component is represented within the system as an object which has properties such as e.g. type, identity, location 29 as well as user-defined or function-dependent properties 30. The behavior of the relevant component is therefore already documented within the graphical illustration, to the effect that when linking the data interfaces 26 the control-relevant information items of the individual components can be recorded automatically and related to each other. In this way, the control-relevant information is recorded automatically when the components $21_{1...j}$ are joined or the material flow 27 is entered, and is advantageously available to the developer for the specification of an automation solution for the system which is graphically represented.

Figure 3:
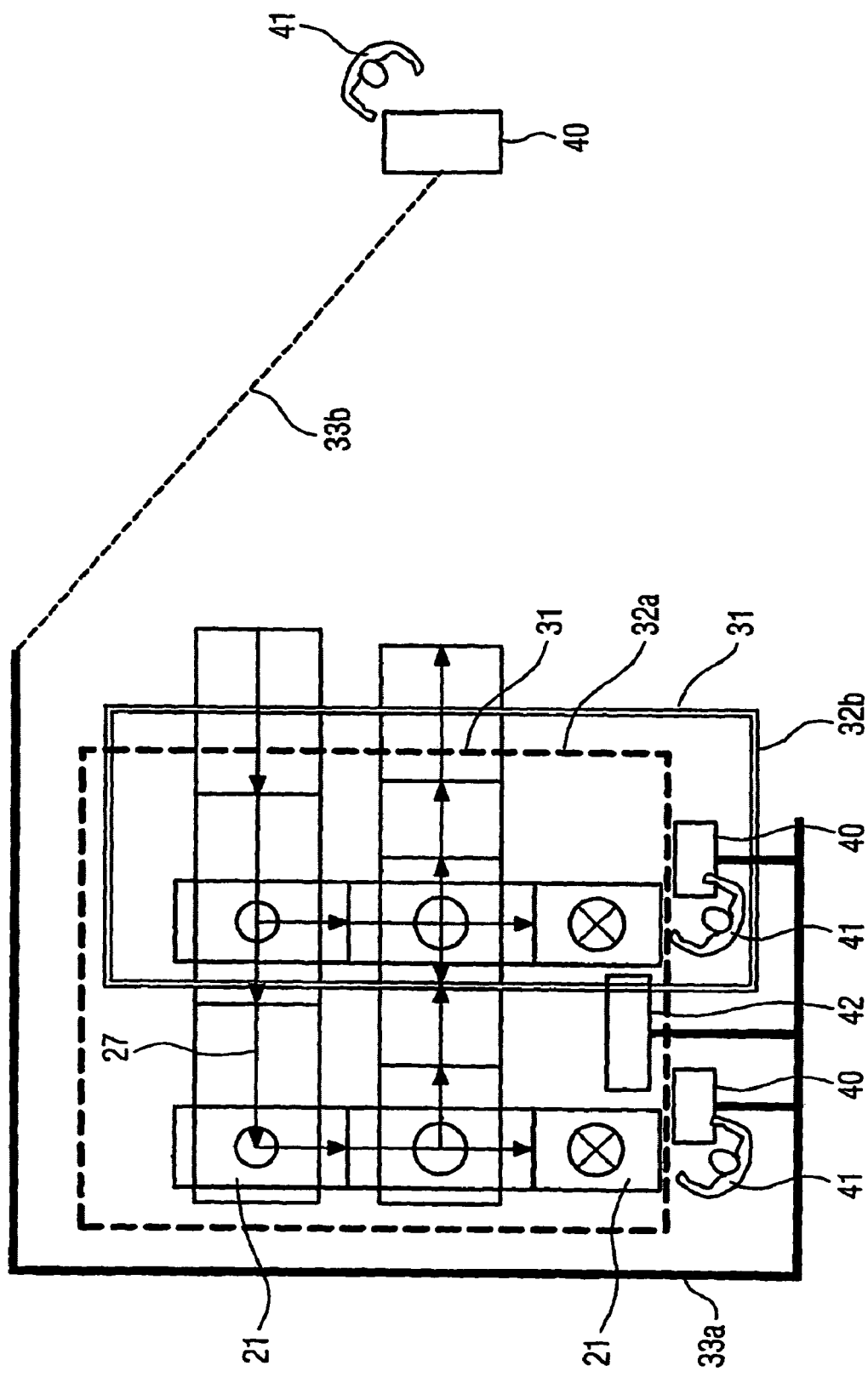
FIG. 3 shows a schematic diagram of the graphical reproduction of a plant section.

FIG 3 shows an exemplary embodiment of the system for layout-oriented recording of control-relevant information, in which components $21_{1...i}$ are combined into groups 31. Higher-order semantics 32 can be assigned to the groups 31 in this context. After completion of the configuration of a site in a graphical manner, a network configuration 33 can be graphically established with the aid of the system.

When creating the communication network 33, graphical relationships are constructed between the communication components e.g. a Profibus and the control components e.g. an SPC. This takes place via data interfaces/ports 26 or the graphical representations thereof. The establishment takes place on the basis of an information flow 28 or on the basis of energy flow relationships. In addition to the material flow 27, it is thus possible to record any other information flows, energy flows or substance flows within the framework of the claimed invention, said recording being graphical and therefore also data-related.

FIG. 3 illustrates the way in which components $21_{1...i}$ can be combined into functional groups 31. In the graphical representation, this is done by forming a selection set and selecting a functional group 31, e.g. in a tree view, and executing of a set of operations, e.g. add/delete. Components $21_{1...i}$ can be added to or deleted from a group 31 in this way. Components $21_{1...j}$, functional groups 31 and data interfaces 26 can be assigned so-called "constraint elements" in this case. According to the invention, these are elements which exercise constraints in such a way that e.g. the validity of value ranges is defined for individual features or attributes.

The assignment of higher-order semantics 32 (PLC area 32a, HMI area 32b) to specific groups 31 has the advantage that a set of components $21_{1...i}$ can be given a higher-order property. For example, a plurality of components $21_{1...i}$ can be combined in such a way that they are represented in the context of an operations and monitoring system 40, so that they can be displayed for a plant operator at the plant or on the shop floor. Components $21_{1...i}$ can likewise be combined in order to assign them to a controller (SPC, PLC). In the same way, it is possible to implement special circuits which, for example, represent an emergency on/off in the context of an "emergency area". Groups 31 can be combined without restriction and a component $21_i$ can be assigned to any number of groups 31.

A higher-level behavior of the participating components $21_{1...i}$ can therefore be derived easily from the graphical layout, and the automation-relevant information items which are required for this purpose are provided automatically. A network topology 33 can be implemented easily likewise. The layout of the network which must be specified is derived automatically from the relationships 23 of the components $21_{1...j}$ to each other. The question of which data connection should be used, e.g. a bus system 33a or an Ethernet 33b, can already be specified with reference to the automation-relevant information which is present in the graphical system. It is likewise possible to design the redundant configuration of data transmission devices with reference to the underlying information, for example, since the layout clearly indicates which areas of the designed plant are security-related and therefore must have a redundant data transmission device.

The grouping of the components $21_{1...j}$ into higher-level units as illustrated in FIG. 3 facilitates overall the design of the automation solution of the plant in a simple way, since the higher-level units are assigned higher-order semantics 32, allocation to a controller or to an operations and monitoring system in each case, and structuring can be undertaken graphically by the developer on the basis of the plant layout.

In summary, the invention relates to a system and a method for graphically recording system requirements and specifications in a form which can be analyzed electronically. Elements of a plant are represented graphically by means of selectable components 21. The components 21 are positioned graphically in relation 23 to each other and, on the basis of the established relationship 23, a control-relevant interconnection 24 is automatically specified and provided in electronic form.

The invention comprises further advantageous embodiments regarding a method:

The information flow 28 between the components $21_{1...j}$ runs counter to the material flow 27.

The directed relationships 23 between data interfaces 26 of adjacent components $21_{1...j}$ are established on the basis of the distance of the components $21_{1...j}$ from each other and existing information about the data interfaces 26.

Type information and/or entity information and/or location information about the components $21_{1...j}$ from the graphical layout is used.

Further properties 30 are added to components $21_{1...j}$ in a layout-oriented manner.

Components $21_{1...i}$ are combined into groups 31 in a layout-oriented manner.

Higher-order semantics 32 are assigned to the groups 31 in a layout-oriented manner.

Elements for delimiting permitted value ranges and/or attributes are assigned to components $21_{1...j}$ and/or functional groups 31) and/or data interfaces 26.

A network configuration 33 for the communication of the components $21_{1...m}$ of a process-engineering and/or production-engineering plant is generated in a layout-oriented manner.

The invention claimed is:

1. A system for the layout-oriented recording of control-relevant information, comprising:
    a first mechanism for graphically describing structures comprising components;
    a second mechanism for graphically establishing at least one directed relationship between the components;
    a third mechanism for specifying a control-relevant interconnection of the components depending on the established relationships, wherein the establishment of the directed relationships between the components is accomplished based on the following relationships in a process-engineering and/or production-engineering plant: a material flow between at least two components, an energy flow between said at least two components and an information flow between said at least two components; and
    a graphical user interface configured to display the following: a graphical representation of the material flow between said at least two components, a graphical representation of the energy flow between said at least two components, and a representation of the information flow between said at least two components, wherein the information flow further comprises information flow from components that precede said at least two components and which runs in a direction opposite to a direction of the material flow or opposite to a direction of the energy flow to provide a graphical two-way traceability in the process-engineering and/or the production-engineering plant.

2. The system according to claim 1, wherein the components are physical components.

3. The system according to claim 1, wherein the control-relevant information is provided for recording for an automation system of a process-engineering and/or production-engineering plant.

4. The system according to claim 1, wherein the components are embodied as types having type-dependent properties and data interfaces.

5. The system according to claim 4, wherein the types are provided in a library.

6. The system according to claim 1, wherein the interconnection of the components is accomplished via the data interfaces.

7. The system according to claim 1, wherein the establishment of the directed relationships between data interfaces of adjacent components is accomplished on the basis of a distance of the components from each other and by using information about the data interfaces.

8. The system according to claim 1, wherein type information, and/or entity information, and/or location information about the components is provided for use from the graphical layout.

9. The system according to claim 1, further comprising a fourth mechanism for the layout-oriented adding of further properties to the components.

10. The system according to claim 1, wherein the components are combined into groups in a layout-oriented manner.

11. The system according to claim 10, further comprising a layout-oriented assignment of higher-order semantics to the groups.

12. The system according to claim 1, further comprising an assignment of elements for delimiting permitted value ranges, and/or attributes to components, and/or functional groups, and/or data interfaces.

13. The system according to claim 1, further comprising a layout-oriented generation of a network configuration for the communication of the components of a process-engineering and/or production-engineering plant.

14. A method for layout-oriented acquiring of control-relevant information, comprising:
    graphically describing structures having individual components;
    graphically establishing at least one directed relationship between the individual components; and
    defining a control-relevant interconnection of the individual components on the basis of the established relationships, wherein the establishing of the directed relationships between the components is accomplished based on the following relationships in a process-engineering and/or production-engineering plant: a material flow between at least two components, an energy flow between said at least two components and an information flow between said at least two components; and
    displaying the following: a graphical representation of the material flow between said at least two components, a graphical representation of the energy flow between said at least two components, and a representation of the information flow between said at least two components, wherein the information flow further comprises information flow from components that precede said at least two components and which runs in a direction opposite to a direction of the material flow or opposite to a direction of the energy flow to provide a graphical two-way traceability in the process-engineering and/or the production-engineering plant.

15. The method according to claim 14, wherein the control-relevant information is acquired for an automation system of a process-engineering and/or production-engineering plant.

16. The method according to claim 14, wherein the components are managed in a library as types having type-dependent properties and data interfaces.

17. The method according to claim 14, wherein the components are interconnected by data interfaces of the components.

* * * * *